(12) United States Patent
Schuster et al.

(10) Patent No.: US 10,196,157 B2
(45) Date of Patent: Feb. 5, 2019

(54) BOTTOM OF A COUPLING MODULE AS AN INTERFACE BETWEEN A PASSENGER BRIDGE OR STAIRS AND THE FUSELAGE OF AN AIRCRAFT

(71) Applicant: Hübner GmbH & Co. KG, Kassel (DE)

(72) Inventors: Heinz Schuster, Kassel (DE); Frank Klöckl, Felsberg (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 15/718,296

(22) Filed: Sep. 28, 2017

(65) Prior Publication Data

US 2018/0086484 A1    Mar. 29, 2018

(30) Foreign Application Priority Data

Sep. 28, 2016   (EP) ..................................... 16190982

(51) Int. Cl.
*E01D 18/00* (2006.01)
*B64F 1/305* (2006.01)
*E01D 19/12* (2006.01)

(52) U.S. Cl.
CPC .............. *B64F 1/305* (2013.01); *E01D 18/00* (2013.01); *E01D 19/125* (2013.01)

(58) Field of Classification Search
CPC ........ B64F 1/305; E01D 18/00; E01D 19/125
USPC .................................... 14/69.5–71.5; 700/13
See application file for complete search history.

(56) References Cited

U.S. PATENT DOCUMENTS

2003/0120358 A1   6/2003   Hutton
2003/0136898 A1   7/2003   Oki et al.
2006/0070193 A1   4/2006   Hutton et al.

FOREIGN PATENT DOCUMENTS

EP        2463199 B1    2/2013
WO        0134467 A1    5/2001

*Primary Examiner* — Raymond W Addie
(74) *Attorney, Agent, or Firm* — Dinsmore & Shohl LLP

(57) ABSTRACT

A bottom of a coupling module as an interface between a passenger bridge or stairs and the fuselage of an aircraft, the coupling module featuring an exit opening, the floor comprising a floor head part, the floor head part being horizontally slidable, under the control of at least one sensor arrangement, in the direction of the exit opening of the coupling module, while forming a front side distance between the floor head part and the aircraft fuselage.

22 Claims, 3 Drawing Sheets

BOTTOM OF A COUPLING MODULE AS AN INTERFACE BETWEEN A PASSENGER BRIDGE OR STAIRS AND THE FUSELAGE OF AN AIRCRAFT

REFERENCE TO RELATED APPLICATION

This application claims priority from EP Application No. EP16190982.5, filed Sep. 28, 2016, the entire content of both of which is incorporated herein by reference.

FIELD OF THE INVENTION

The invention relates to the bottom of a coupling module as an interface between a passenger bridge or stairs and the fuselage of an aircraft. The coupling module has an exit opening and the floor comprising a floor head part. The invention also relates to a coupling module as an interface between a passenger bridge or passenger boarding stairs and the fuselage of an aircraft.

BACKGROUND OF THE INVENTION

The coupling module as an interface between a passenger bridge or stairs and the fuselage of an aircraft is known from the prior art. Such coupling modules are disposed, for example on the passenger boarding bridge, in the area of the front end of the passenger boarding bridge and form the immediate transition from the passenger bridge on the one hand and the aircraft on the other hand. In particular, such a coupling module as an interface comprises a folding canopy, the folding canopy being U-shaped in a front view and featuring a bumper at its end, with which the folding canopy can be swung out by way of an appropriate pivoting device toward the fuselage of the aircraft in the area of the entrance of the aircraft. Before the canopy is swung toward the fuselage of the aircraft, the passenger bridge with the coupling module is driven relatively close to the aircraft, ideally until the floor area of the coupling module comes to rest with the front side bumper on the fuselage of the aircraft.

However, the fuselages of aircraft are very contoured, in particular in the front area of the aircraft. This means that a complete abutment of the floor of the coupling module on the aircraft could not be ensured, in particular in the front area of the aircraft fuselage. In this respect, the document EP 2 463 199 B1 already discloses a floor of a coupling module, which can be at least partially segmented. Especially in the case of a coupling module that must come to rest on an aircraft in the front area of the aircraft fuselage in the area of the door opening, this allows for a gap-less abutment on the aircraft fuselage, at least in the highly contoured area of the aircraft fuselage.

However, the latest aircraft have an outer hull that no longer allows for an abutment of parts of the passenger bridge or passenger boarding stairs on the outer hull of the fuselage of the aircraft, because the aircraft hull is made of a synthetic material, so that even a light abutment of components, of a passenger bridge for example, can lead to damage to the fuselage. It would be desirable to overcome the limitations of the existing coupling modules and to provide a better solution.

SUMMARY OF THE INVENTION

In order to overcome the limitations of the prior art, the present invention comes into play, since it teaches, in this context, that the floor head part is horizontally slidable, under the control of at least one sensor arrangement, in the direction of the exit opening of the coupling module, while forming a minimal front side distance between the floor head part and the aircraft fuselage. This proceeds from the assumption that a contact of the aircraft fuselage at least with the floor of the coupling module is prevented by such a minimal front side distance between the floor and the fuselage, the sensor arrangement preventing the distance from dropping below a minimum distance.

Sensor arrangements are known from the prior art, in particular sensor arrangements that serve to position a passenger bridge at the door of an aircraft. In this respect, using a sensor with a light source, which emits electromagnetic radiation in a radiation direction, and with a detector, which detects electromagnetic radiation reflected by a surface of the aircraft, for positioning a mobile passenger bridge at the door of an aircraft is known from WO 01/344671n A1. In doing so, a travel time of the electromagnetic radiation from the light source to the detector is determined, from which the distance between the sensor and the aircraft in the direction of radiation is deducted. In order to scan different points on a surface of the aircraft with the electromagnetic radiation and thus to be able to determine a line profile of the surface, the direction of radiation can be varied by means of a swiveling mirror. The line profile determined in this manner is used together with information regarding the position of the door on the aircraft stored in a computer for a correct positioning of the passenger bridge at the aircraft in the area of the door. However, the objective here still is to dock the coupling module of the passenger bridge in the area of the canopy and in the area of the floor on the fuselage of the aircraft.

As explained earlier, the subject-matter of the invention is that the floor head part no longer comes to rest on the aircraft fuselage but is located at a distance, in particular a minimal distance, from the fuselage of the aircraft. The distance may be between 10 and 50 mm, meaning that there is no danger for people boarding the aircraft of getting inside the gap between the floor and the aircraft fuselage. The gap width is chosen so that there is a sufficient safety clearance between the front side of the floor head part and the outer hull of the aircraft, and that there is no danger for passengers of getting stuck in or even passing through the gap with their feet.

Thus, one particular feature of the invention provides that the floor comprises a stationary floor section, the at least one floor head part being movably disposed on the stationary floor section. From this, it is clear that the floor has two parts, namely a stationary floor section, which is attached directly to the rear end of the coupling module, and a floor head part that is movable relative to the stationary floor section and that is movable toward the fuselage of the aircraft, i.e. toward the exit opening of the coupling module, a drive device being provided for the displacement.

Another feature of the invention is characterized in that the floor head part comprises several floor segments, which are at least partially horizontally displaceable relative to each other. This means that the individual floor segments are displaceable transversely to the longitudinal axis of the aircraft toward the fuselage of the aircraft. In other words, the floor segments are displaceable parallel to the lateral wall of the coupling module. The segmentation of the floor head part into individual segments along the entire width of the floor head part ensures that the floor of the coupling module can take up a substantially equal, in particular minimal distance relative to the aircraft fuselage in the area of the entrance door of the aircraft, along the entire width of the coupling module.

In contrast to the prior art according to EP 2 463 199 B1, in which, as has already been explained, only a part of the floor head part is configured in a segmented manner, the present invention makes it possible to ensure a constant minimal distance relative to the aircraft fuselage, even when the coupling module is at a slight angle relative to the fuselage of the aircraft.

It has already been pointed out that the floor head part is displaceable in the direction of the aircraft fuselage by a drive device. If the floor head part comprises a plurality of floor segments, as has already been explained, which are displaceable relative to each other in the direction of the aircraft fuselage, i.e. toward the exit opening of the coupling module, at least a part of the floor segments, but more specifically each floor segment, may have its own drive device.

According to another feature of the invention, it is provided that at least a part of the floor segments is driven with the help of a sensor arrangement during a displacement in the direction of the exit opening of the coupling module for forming the minimal front side distance relative to the aircraft fuselage. This means that the respective drive device of the individual floor segments or of a plurality of floor segments is connected in a signal transmitting manner with the sensor arrangement, so that it can thus be ensured that a preset distance can be kept between the front side of the individual floor segments and the aircraft hull of the aircraft fuselage using a control device. This shows that the number of drive devices can be less than the number of floor segments; the same applies to the number of sensors on the floor segments.

According to another feature of the invention, the floor head part features a floor bumper on its front side. The floor bumper comprises a continuous bumper metal sheet that is disposed at the front of the floor head part or the individual floor segments, and on the front side of which the bumper cushion is disposed. In some embodiments, each individual floor segment may have a floor bumper/bumper element. The floor bumper ensures that in the case of jerky movements of the aircraft and/or of the passenger bridge, respectively relative to each other, and the accompanying risk of the front side of the coupling module coming into contact with the outer hull of the aircraft in spite of the gap, the outer hull of the aircraft is protected by the floor bumper.

The sensor arrangement detects the contour of the fuselage, at least in the area of the front side of the floor of the coupling module, but preferably the entire entrance area, i.e. the area of the entrance door of the aircraft. To this end the sensor arrangement features several sensors, wherein at least a part of the floor segments is equipped with respectively one sensor of the sensor arrangement. Even if only a part of the floor segments is equipped with a sensor and/or a drive device, the bumper on the free front side of the floor segments causes an even distribution of the extension of the floor segments, in terms of an evened outer front contour of the floor segments, which means that a constant distance between the floor segments and the fuselage of the aircraft can thereby be kept.

Each sensor may comprise a light-emitting unit, which is connected to a detector, wherein the detector can either be part of the light-emitting unit or can be disposed separately in the floor area of the coupling module. Alternately, ultrasound sensors can be used. Such a sensor arrangement not only detects the contour of the fuselage at least in the area of the floor of the coupling module, but can also scan the contour of the fuselage in the area of the entrance door, i.e. the area that is covered by the coupling module. This should be seen in the light of the following. The coupling module features a canopy that can be swung out by a pivoting device and that can, in principle, be swung toward the aircraft fuselage independently from the movement of the floor head part. If the sensor arrangement is able to detect not only the contour of the aircraft fuselage in the area of the floor of the coupling module, but the entire entrance area, as previously described, it is possible to control the movement of the pivoting device for the pivoting canopy by way of the sensor arrangement, i.e. to control the pivoting movement of the canopy of the coupling module. In this respect, the pivoting device is connected, in a signal-transmitting manner, with the control device of the sensor arrangement.

According to another feature of the invention, the floor head part is displaceably connected to the canopy. This means that when the floor head part is displaced in the direction of the open front side of the coupling module, the canopy of the coupling module is also extended in the floor area. This must be seen in light of the fact that a lateral screen against climatic conditions is provided in the area of the transition of the lateral walls of the coupling module to the aircraft fuselage. Another subject-matter of the invention is a coupling module as an interface between the passenger bridge or stairs and the fuselage of the aircraft.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the following, the invention is exemplarily described in more detail based on the drawings. In the drawings.

DETAILED DESCRIPTION OF THE INVENTION

It is to be understood that both the foregoing general description and the following detailed description of the present invention are exemplary and explanatory and are intended to provide further explanation of the invention as claimed.

Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
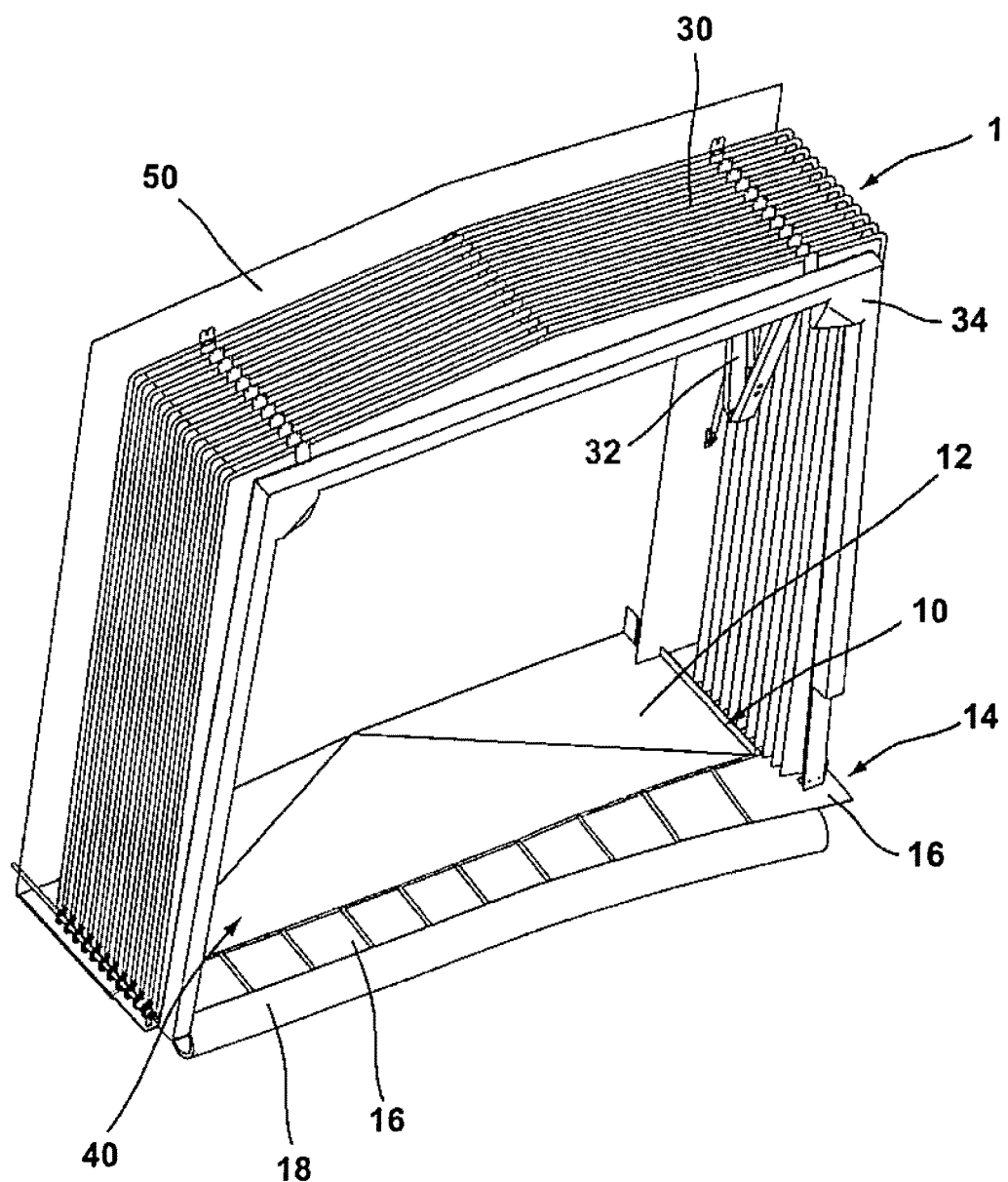
FIG. 1 is a perspective representation of the coupling module in a view toward the exit opening facing the aircraft.

According to FIG. 1, the coupling module 1 comprises the floor labeled 10 and the pivoting canopy 30. The floor 10 of the coupling module 1 comprises the stationary floor section 12 as well as the floor head part 14, which is designed so as to be horizontally extendable in the direction of the exit opening 40 of the coupling module. Across its entire width, the floor head part 14 comprises a plurality of adjacently disposed floor segments 16, which are received by the stationary floor section 12 of the floor 10 of the coupling module 1 in such a manner that they are displaceable relative to each other. On the front side, the floor head part 14 features the floor bumper 18, which connects the individual floor segments 16 of the floor head part 14 to each other by way of the bumper metal sheet. The bumper cushion is located on the bumper metal sheet. In some embodiments of the present invention, each floor segment may have its own floor bumper. The individual floor segments 16 can be displaceably connected to each other by a groove and spring connection, in order to increase the overall stability of the floor head part.

As a part of the coupling module 1, the canopy 30, which is disposed on the front wall 50 of passenger boarding stairs or bridge (not shown), is pivotable toward the aircraft fuselage by way of one, preferably of two pivoting devices 32. The canopy 30 comprises a canopy bumper 34. In some embodiments, the canopy and the canopy bumper are approximately U-shaped. This means that respectively one pivoting device 32 can be disposed on both sides of the canopy 30 in the roof area of the canopy.

Figure 2:
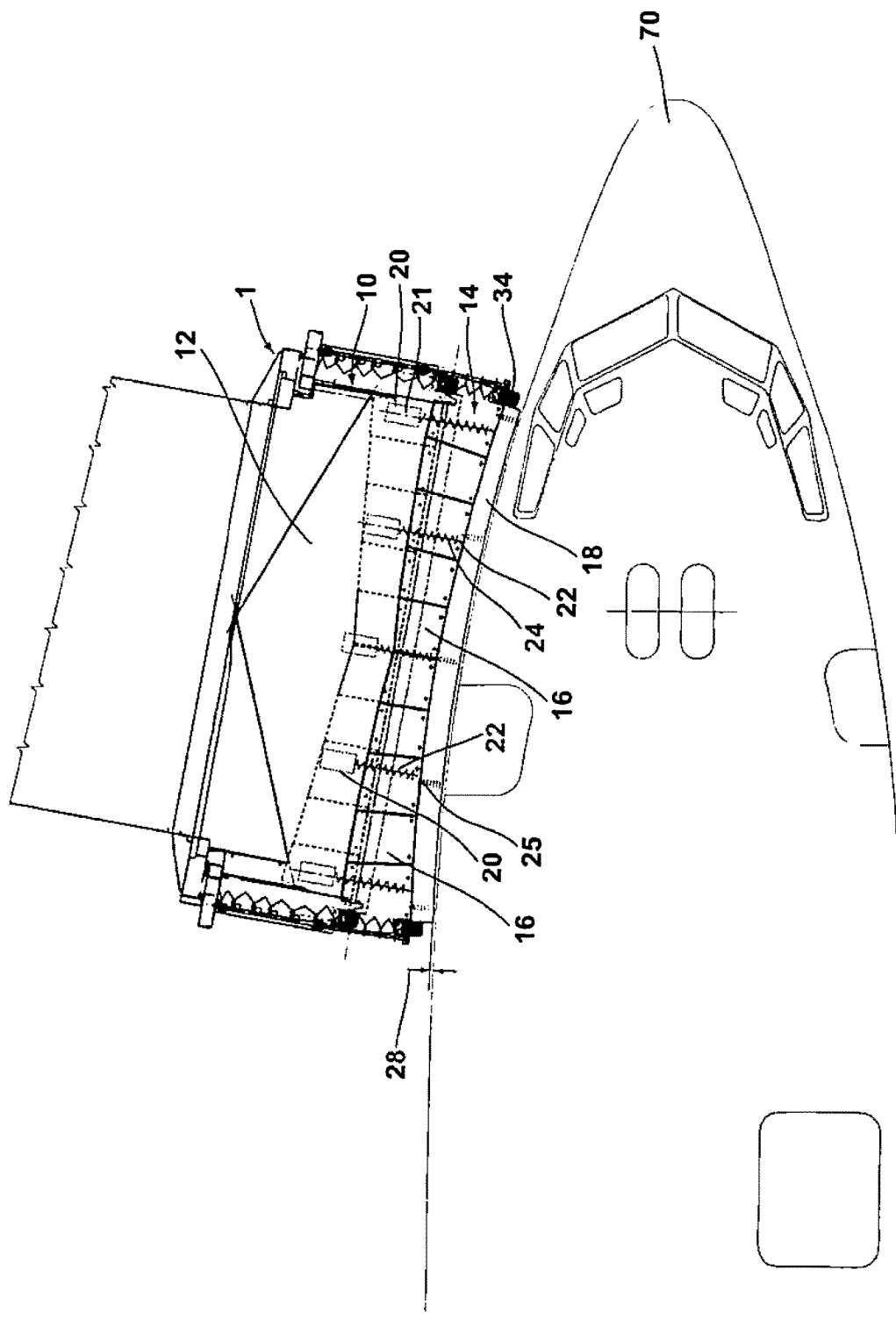
FIG. 2 is a sectional representation of the coupling module in the extended position of the floor head part resting against the aircraft fuselage in a view from above.
Figure 3:
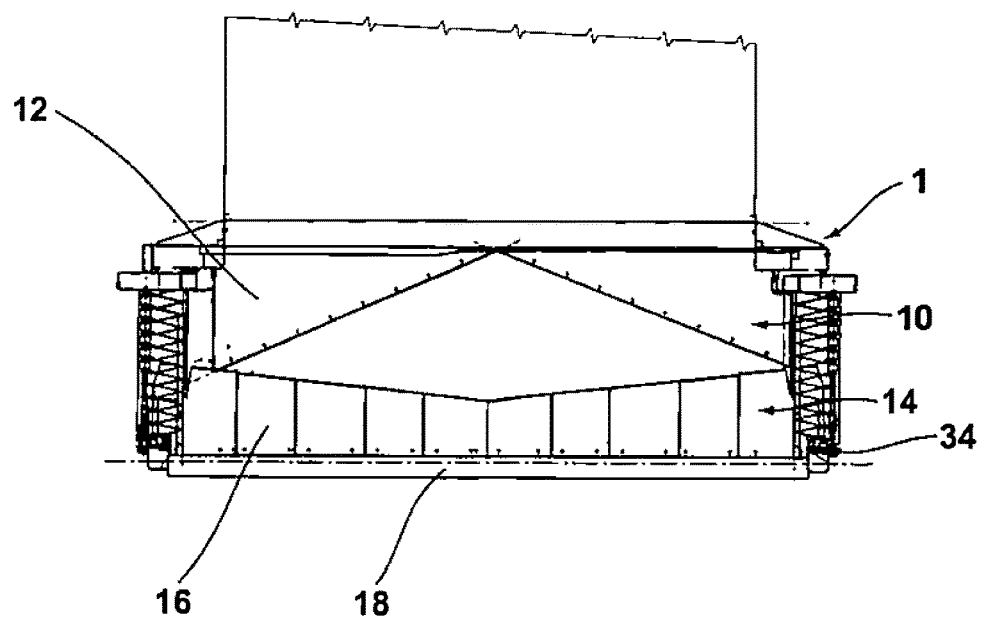
FIG. 3 is a representation of the coupling module with a retracted floor head part.

According to FIGS. 2 and 3, the individual floor segments 16 are displacebly mounted below the stationary floor section 12 on the floor section 12. Respectively one drive device 20 is provided for extending the individual floor segments 16, wherein the drive device 20 comprises a cable pull 21 with a cable 22. In the retracted state (FIG. 3) of the floor segments, the floor segments are subject to the force of the spring 24. In case of a slackening of the cable 22, the corresponding floor segment 16 is displaced in the direction of the aircraft 70 by the spring, which is supported on the one hand in the front end of the floor segment or the bumper metal sheet, and on the other hand e.g. in the housing of the cable pull 21. Such a drive device 20 can be provided with each individual floor element 16; however, one may couple several floor segments with each other and displace them by means of one or several such drive devices. In this case, an even distribution of the extension of the floor segments takes place by way of the floor bumper connecting the floor segments. The advantage of using a cable pull in connection with a spring for extending or retracting the floor segments is that such a drive device is yielding, in particular in contrast to a piston cylinder drive. This must be seen in the light of the fact that, during loading and unloading, the aircraft 70 partly jerks and moves downwards or upwards. This means that the aircraft fuselage may get into contact with the floor bumper despite the distance 28 between the aircraft fuselage and the floor bumper. In order to avoid damage to the outer hull as much as possible, the choice of the drive device 20 ensures that the floor segments, and correspondingly the floor bumper, can retreat, i.e. be retracted. This would be impossible or hardly possible with a piston cylinder drive as a drive device, for example.

In addition, sensors 25 may be provided in the front area of the floor segments 16. With these sensors, which are connected to a corresponding control unit, it can be ensured that the floor segments 16, respectively the floor head part 14 as a whole, keeps a specific distance relative to the aircraft fuselage. The distance 28 must be kept constant, as much as possible, along the entire width of the floor 10. This is achieved by the fact that the floor head part has relatively small parts in the form of the plurality of individual floor segments.

LIST OF REFERENCE NUMBERS

1 Coupling module
10 Floor
12 Stationary floor section
14 Floor head part
16 Floor segment
18 Floor bumper
20 Drive device
21 Cable pull
22 Cable
24 Spring
25 Sensors
28 Front side distance
30 Canopy
32 Pivoting device
34 Canopy bumper
40 Exit opening of the coupling module
50 Front wall (Passenger Bridge)
70 Aircraft It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing detailed description has been presented for purposes of illustration and description. It is not intended to be exhaustive or to limit embodiments to the precise form disclosed. Many modifications and variations are possible in light of the above teaching. The described embodiments were chosen in order to explain principles and practical applications, to thereby enable others skilled in the art to best utilize various embodiments and with various modifications as are suited to the particular use contemplated. It is intended that the scope be defined by the claims appended hereto.

The invention claimed is:

1. A bottom of a coupling module as an interface between a passenger bridge or stairs and a fuselage of an aircraft, comprising:
   a drive device;
   a sensor arrangement; and
   a floor head part attached to a coupling module, the floor head part being horizontally slidable in a direction transverse to a longitudinal axis of an aircraft, the drive device sliding the floor head part toward a fuselage of the aircraft under the control of the sensor arrangement, the sensor arrangement determining a distance between the floor head part and the fuselage of the aircraft, the drive device and the sensor arrangement configured to maintain at least a front side distance between the floor head part and the fuselage of the aircraft.

2. The bottom of a coupling module according to claim 1, further comprising a stationary floor section having a rear end and a front end, the rear end of the stationary floor section attached to the coupling module, the front end of the stationary floor section disposed toward the fuselage of the aircraft, the floor head part being attached to the coupling module through the stationary module such that the floor head part is displaceably disposed on the stationary floor section, the floor head part being displaceable substantially parallel to the stationary floor section.

3. The bottom of a coupling module according to claim 1, further comprising a floor bumper, the floor head part having a first end toward the fuselage of the aircraft and an opposing second end, the floor bumper being disposed on the first end of the floor head part.

4. The bottom of a coupling module according to claim 1, wherein the sensor arrangement is configured to detect a contour of the fuselage of the aircraft in an area between the floor head part and the fuselage of the aircraft, and/or to detect a contour of the fuselage around an entire entrance area of the aircraft.

5. The bottom of a coupling module according to claim 1, wherein the front side distance between the floor head part and the fuselage of the aircraft is adjustable about a predetermined valve by the sensor arrangement.

6. The bottom of a coupling module according to claim 1, wherein the sensor arrangement comprises a light emitting sensor and/or an ultra sound sensor.

7. The bottom of a coupling module according to claim 1, wherein the drive device is connected with the sensor arrangement in a signal transmitting manner.

8. The bottom of a coupling module according to claim 1, wherein the sensor arrangement comprises a control device.

9. The bottom of a coupling module according to claim 1, wherein the floor head part comprises a plurality of floor segments, the plurality of floor segments disposed along a direction of the longitudinal axis of the aircraft, at least one of the plurality of floor segments being horizontally slidable relative to another of the plurality of floor segments.

10. The bottom of a coupling module according to claim 9, wherein at least one of the plurality of floor segments is controlled by the sensor arrangement to maintain at least the front side distance between the floor head part and the fuselage of the aircraft.

11. The bottom of a coupling module according to claim 9, wherein at least one of the plurality of floor segments is horizontally slidable by the drive device.

12. The bottom of a coupling module according to claim 9, further comprising a plurality of floor bumpers, each of the plurality of floor segments having a first end toward the fuselage of the aircraft and an opposing second end, each of the plurality of floor bumpers being disposed on the respective first end of the plurality of floor segments.

13. The bottom of a coupling module according to claim 9, wherein the drive device comprises a cable pull and a cable, the cable being connected to the cable pull and the floor head part in order to horizontally slide the floor head part.

14. The bottom of a coupling module according to claim 9, wherein each of the plurality of floor segments is connected with the adjacent floor segment by a groove and spring connection.

15. The bottom of a coupling module according to claim 9, wherein the sensor arrangement comprises a plurality of sensors.

16. The bottom of a coupling module according to claim 15, wherein at least one of the plurality of sensors is configured with at least one of the plurality of floor segments to maintain at least the front side distance.

17. The bottom of a coupling module according to claim 1, further comprising:
a canopy attached to the coupling module, the canopy having a collapsed position and an extended position, the canopy operable to swing in the direction transverse to a longitudinal axis of the aircraft; and
at least one pivoting device configured to swing the canopy from the collapsed position to the extended position and vice versa.

18. The bottom of a coupling module according to claim 17, wherein the at least one pivoting device is connected with the sensor arrangement in a signal transmitting manner.

19. The bottom of a coupling module according to claim 17, wherein the canopy is U-shaped.

20. The bottom of a coupling module according to claim 17, wherein the canopy comprises a canopy bumper, the canopy having a first end toward the fuselage of the aircraft and an opposing second end, the canopy bumper being disposed on the first end of the canopy.

21. The bottom of a coupling module according to claim 17, wherein the canopy can be swung from the collapsed position to the extended position and vice versa independent of the horizontal sliding of the floor head part.

22. The bottom of a coupling module according to claim 17, wherein the canopy is displaceably connected with the floor head part.

* * * * *